United States Patent
Chambliss et al.

(10) Patent No.: US 9,659,060 B2
(45) Date of Patent: May 23, 2017

(54) ENHANCING PERFORMANCE-COST RATIO OF A PRIMARY STORAGE ADAPTIVE DATA REDUCTION SYSTEM

(75) Inventors: David D. Chambliss, Morgan Hill, CA (US); Mihail C. Constantinescu, San Jose, CA (US); Joseph S. Glider, Palo Alto, CA (US); Maohua Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 13/460,611

(22) Filed: Apr. 30, 2012

(65) Prior Publication Data

US 2013/0290276 A1  Oct. 31, 2013

(51) Int. Cl.
*G06F 17/30* (2006.01)
*G06F 7/00* (2006.01)

(52) U.S. Cl.
CPC .. *G06F 17/30489* (2013.01); *G06F 17/30156* (2013.01)

(58) Field of Classification Search
None
See application file for complete search history.

(56) References Cited

U.S. PATENT DOCUMENTS

| | | | |
|---|---|---|---|
| 7,539,661 B2 | 5/2009 | Wang | |
| 7,962,452 B2 | 6/2011 | Anglin | |
| 8,209,498 B2 | 6/2012 | Takata et al. | |
| 8,266,114 B2 | 9/2012 | Mace et al. | |
| 8,335,760 B1 * | 12/2012 | Kumar et al. | 707/609 |
| 8,392,384 B1 | 3/2013 | Wu et al. | |
| 8,397,080 B2 | 3/2013 | Lu et al. | |
| 8,412,682 B2 | 4/2013 | Zheng et al. | |
| 8,589,640 B2 | 11/2013 | Colgrove et al. | |
| 8,626,723 B2 | 1/2014 | Ben-Shaul et al. | |
| 8,725,946 B2 | 5/2014 | Petersen et al. | |

(Continued)

FOREIGN PATENT DOCUMENTS

| CN | 101710323 A | 5/2010 |
|---|---|---|
| CN | 102024032 | 4/2011 |

(Continued)

OTHER PUBLICATIONS

Anonymous, "A method for reducing information leakage via cross-user deduplication mechanisms," Sep. 14, 2010, pp. 1-3, downloaded from IP.COM, IP.com No. IPCOM000199656D, United States.

(Continued)

*Primary Examiner* — Usmaan Saeed
*Assistant Examiner* — Yu Zhao
(74) *Attorney, Agent, or Firm* — Sherman IP LLP; Kenneth L. Sherman; Hemavathy Perumal (57) ABSTRACT

Data reduction in a storage system comprises determining attributes of data for storage in the storage system and determining expected data reduction effectiveness for the data based on said attributes. Said effectiveness indicates the benefit that data reduction is expected to provide for the data based on said attributes. The data reduction further comprises applying data reduction to the data based on the expected data reduction effectiveness and performance impact, to improve resource usage efficiency.

20 Claims, 7 Drawing Sheets

(56) References Cited

U.S. PATENT DOCUMENTS

| | | |
|---|---|---|
| 9,141,621 B2 | 9/2015 | Lillibridge et al. |
| 9,292,530 B2 | 3/2016 | Yasa et al. |
| 2003/0044076 A1* | 3/2003 | Mitchell et al. ............. 382/239 |
| 2006/0184505 A1* | 8/2006 | Kedem et al. .................... 707/1 |
| 2009/0100195 A1* | 4/2009 | Barsness et al. ............. 709/247 |
| 2010/0037118 A1 | 2/2010 | Saliba et al. |
| 2010/0088296 A1 | 4/2010 | Periyagaram et al. |
| 2010/0250501 A1 | 9/2010 | Mandagere et al. |
| 2010/0274772 A1 | 10/2010 | Samuels |
| 2011/0029497 A1 | 2/2011 | Benhase et al. |
| 2011/0066666 A1 | 3/2011 | Takaoka et al. |
| 2011/0093439 A1 | 4/2011 | Guo |
| 2011/0218972 A1 | 9/2011 | Tofano |
| 2011/0225191 A1 | 9/2011 | Xie |
| 2011/0238635 A1 | 9/2011 | Leppard |
| 2012/0158670 A1 | 6/2012 | Sharma et al. |
| 2012/0158672 A1* | 6/2012 | Oltean .............. G06F 17/30091 707/692 |
| 2012/0173656 A1 | 7/2012 | Sorenson, III |
| 2013/0086006 A1 | 4/2013 | Colgrove et al. |
| 2013/0275396 A1* | 10/2013 | Condict et al. ............... 707/693 |
| 2013/0290277 A1 | 10/2013 | Chambliss et al. |
| 2015/0363457 A1 | 12/2015 | Chambliss et al. |

FOREIGN PATENT DOCUMENTS

| | | |
|---|---|---|
| CN | 102156736 | 8/2011 |
| CN | 102378696 A | 3/2012 |

OTHER PUBLICATIONS

IBM, "Data DeDuplication Ratio based License Charge," Mar. 4, 2009, pp. 1-3, downloaded from IP.COM, IP.com No. IPCOM000180085D, United States.

Zeng, Li-Fang et al., "Improving Data Locality and Reducing False-Sharing Based on Data Fusion," Jan. 2004, pp. 33-41, Chinese Journal of Computers, vol. 27, No. 1.,China, (English-language Abstract provided).

Patterson, H., et al., "SnapMirror®: File System Based Asynchronous Mirroring for Disaster Recovery," Jan. 28-30, 2002, pp. 117-129, Proceedings of the FAST 2002 Conference on File and Storage Technologies, USENIX Association, Berkeley, California, United States.

Wang, G., et al., "Research on a clustering data de-duplication mechanism based on Bloom Filter," Int'l Conf. on Multimedia Technology, Oct. 2010, pp. 1-5, IEEE, United States.

Wei, J., et al., "DBA: A Dynamic Bloom Filter Array for Scalable Membership Representation of Variable Large Data Sets," 19th IEEE International Symposium on MASCOTS, Jul. 2011, pp. 466-468, IEEE Computer Society, United States.

Wei, J., et al., "MAD2: A Scalable High-Throughput Exact Deduplication Approach for Network Backup Services," IEEE 26th Symp. on MSST, May 2010, pp. 1-14, IEEE, United States.

Zhou, Y., et al., "The Multi-queue Replacement Algorithm for Second Level Buffer Caches," In Proceedings of the USENIX Annual Technical Conference, Jun. 2001, pp. 91-104, USENIX Association, Boston, United States.

U.S. Non-Final Office Action for U.S. Appl. No. 13/460,653 mailed Nov. 6, 2013.

U.S. Non-Final Office Action for U.S. Appl. No. 13/460,653 mailed Apr. 2, 2014.

U.S. Final Office Action for U.S. Appl. No. 13/460,653 mailed Sep. 2, 2014.

U.S. Advisory Action for U.S. Appl. No. 13/460,653 mailed Dec. 4, 2014.

U.S. Non-Final Office Action for U.S. Appl. No. 13/460,353 mailed Jan. 28, 2015.

U.S. Notice of Allowance for U.S. Appl. No. 13/460,653 mailed Jun. 22, 2015.

U.S. Supplemental Notice of Allowability for U.S. Appl. No. 13/460,653 mailed Jul. 21, 2015.

U.S. Non-Final Office Action for U.S. Appl. No. 14/835,268 mailed Oct. 17, 2016 by Examiner Dennis Truong.

\* cited by examiner

ENHANCING PERFORMANCE-COST RATIO OF A PRIMARY STORAGE ADAPTIVE DATA REDUCTION SYSTEM

BACKGROUND

The present invention relates generally to data reduction in storage systems, and more particularly to enhancing performance-cost ratio of a primary storage adaptive data reduction system.

Storage systems are utilized in information technology environments such as enterprise computing systems. Because information technology system managers are generally interested in increasing data storage efficiency, many modern storage systems provide data reduction for increasing storage efficiency and storage savings. Data reduction techniques are increasingly used to store primary data in less storage space. Examples of such data reduction techniques include compression and deduplication. Data reduction requires large amount of processing resources such as processor cycles (MIPS) and memory bus bandwidth to perform the necessary mathematical transformations on the data, resulting in a higher cost/performance ratio.

BRIEF SUMMARY

Embodiments of the present invention provide data reduction for a storage system. One embodiment comprises determining attributes of data for storage in the storage system. Then expected data reduction effectiveness for the data is determined based on said attributes. Said effectiveness indicates the benefit that data reduction is expected to provide for the data based on said attributes. Data reduction is applied to the data based on the expected data reduction effectiveness as weighed against performance impact, to improve resource usage efficiency.

In one embodiment, applying data reduction comprises selectively applying data reduction to the data based on the data reduction effectiveness and available processing resources.

In one embodiment, a type of data reduction for the data is determined based on the data attributes. In one implementation, determining a type of data reduction for the data comprises determining a type of data reduction that is most effective in reducing the data based on the data attributes. In one embodiment, selectively applying data reduction comprises, based on the data reduction effectiveness, storing the data without applying data reduction.

In another embodiment, the present invention provides a storage system comprising a file-write serving module that is invoked in response to a data write, and based on data attributes determines expected data reduction effectiveness for the data based on said attributes. The storage system further comprises an adaptive data reduction module that receives write data, and based on the expected data reduction effectiveness, selectively applies data reduction transformations to the data to achieve best data reduction effectiveness and performance, given limited processing resources.

In one embodiment, the adaptive data reduction module balances the data reduction effectiveness with processing resource state, to determine amount of data processing resources to allocate for data reduction transformations to the data.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Embodiments of the invention relate to enhancing performance-cost ratio of a primary storage adaptive data reduction system. An embodiment of the invention allows performance enhancement for storage systems by selectivity applying data reduction to data. Data reduction techniques require a large amount of processor (e.g., CPU) resources that might otherwise be used for processing I/O requests, and therefore cause the processor utilization to become a system bottleneck which delays the servicing of other I/Os and lowers the overall throughput. According to embodiments of the invention, applying data reduction techniques selectively lowers the overall use of processor resources for data reduction per I/O, while ensuring that the system retains data reduction effectiveness by using processor resources for data reduction only on the data that will benefit the most, leaving more processor resources for processing other I/O requests, thereby increasing overall throughput.

An embodiment of the invention provides performance enhancement functions at different layers in a storage stack. A first performance enhancement function is based on access to specific data information which may be relevant to data reduction. A second performance enhancement function selectively performs data reduction based on data reduction effectiveness for certain data.

In one implementation, the first performance enhancement function collects and summarizes data reduction effectiveness information for a unit of data such as a file, and provides that summary to the second performance enhancement function which based on the supplied information selectively allocates processing resources, if any, for data reduction to increase system throughput for storage efficiency and space-saving.

Different attributes (characteristics) of the data (e.g., size, type, etc.) are used to determine if the data should be considered for data reduction. As such, the first performance enhancement function enables the second performance enhancement function to optimize data path utilization for storage efficiency. There are many ways that data reduction effectiveness information can be shared, according to how the file-writing and data reduction processing components are organized in the system and the communication paths available to them. In one embodiment, a shared memory can be used to maintain a table of hints, wherein each hint includes a data identifier along with a suggestion of what data reductions would be effective and the likely effectiveness of the suggested techniques. In another embodiment, such a hint might be communicated as a message that accompanies the data, or as parameters in a command structure used to make an I/O request.

According to embodiments of the invention, there are a number of classes of files which are not likely to have a positive impact on data reduction effectiveness but may have a negative impact on performance when processing resources are applied to reduce their sizes.

One example of such class of files are files with smaller sizes. Smaller files generally account for a very small volume of the used capacity of a storage system. An embodiment of the invention selectively decreases allocation of processing resources for reducing size of smaller files. This is because such file size reduction is unlikely to have a significant effect on data reduction effectiveness (specially where the per kilobyte count of I/Os to smaller files is disproportionately high relative to I/O to larger files). In one example, small files (e.g., about 8 KB or less) are not deduplicated because they would result in deduplication directory pages to be cached ineffectively. It may still be useful to compress such files.

Another example of such class of files is pre-compressed or otherwise uncompressible or encrypted files. An embodiment of the invention selectively decreases allocation of processing resources for reducing size of pre-compressed or otherwise uncompressible or encrypted files. Such files are unlikely to be compressible by generic techniques but would use considerable computing resources in an attempt to compress (more MIPS per byte are used than for more compressible data). In one example, files known to have bad compression opportunity may be deduplicated but are not compressed.

Another example of such class of files is short-lived files. An embodiment of the invention selectively applies data reduction to the data based on longevity of data. An implementation of the invention selectively decreases allocation of processing resources for reducing size of short-lived files. Such files are likely to be rewritten and their blocks re-used, and will not contribute to long-term data reduction effectiveness.

As such, use of computing resources on reducing sizes of short-lived files may be wasted. In one example, files that will likely be short-lived may be compressed if bandwidth reduction to a backend disk layer is desirable, but deduplicating them may be undesirable if expected deduplication potential is low for such short-lived files.

One embodiment of the invention comprises an adaptive data reduction system implementing a adaptive data reduction method for selectively allocating processing resources for data reduction for scenarios which result in significant data reduction, thereby maintaining (or improving) overall system performance.

Figure 1:
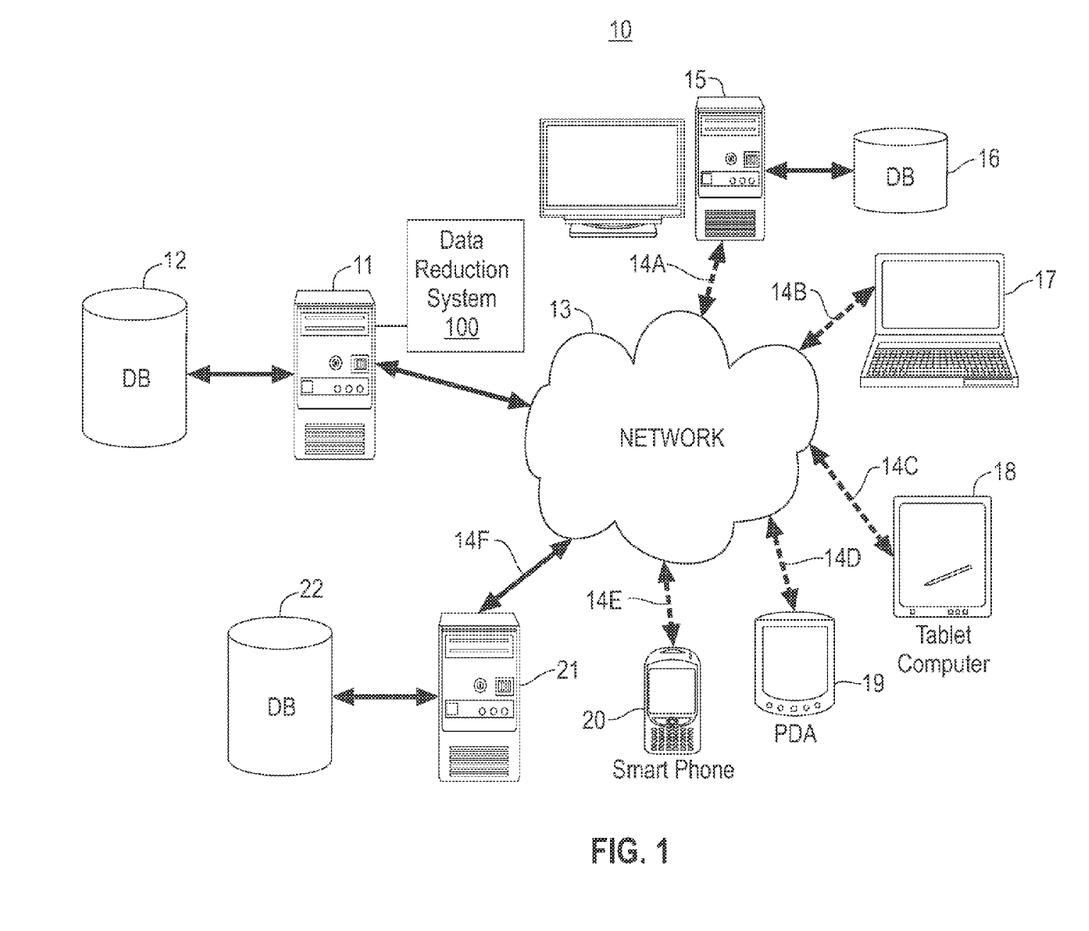
FIG. 1 is a block diagram illustrating an example of a network environment for adaptive data reduction in a storage system, according to an embodiment of the present invention.

Referring now to the drawings, FIG. 1 illustrates an example of the basic components of an information technology system 10 utilizing an adaptive data reduction system 100, used in connection with a preferred embodiment of the present invention. The system 10 includes a storage server 11 and the remote devices 15 and 17-20 that may utilize the adaptive data reduction system 100 of the present invention.

Figure 2:
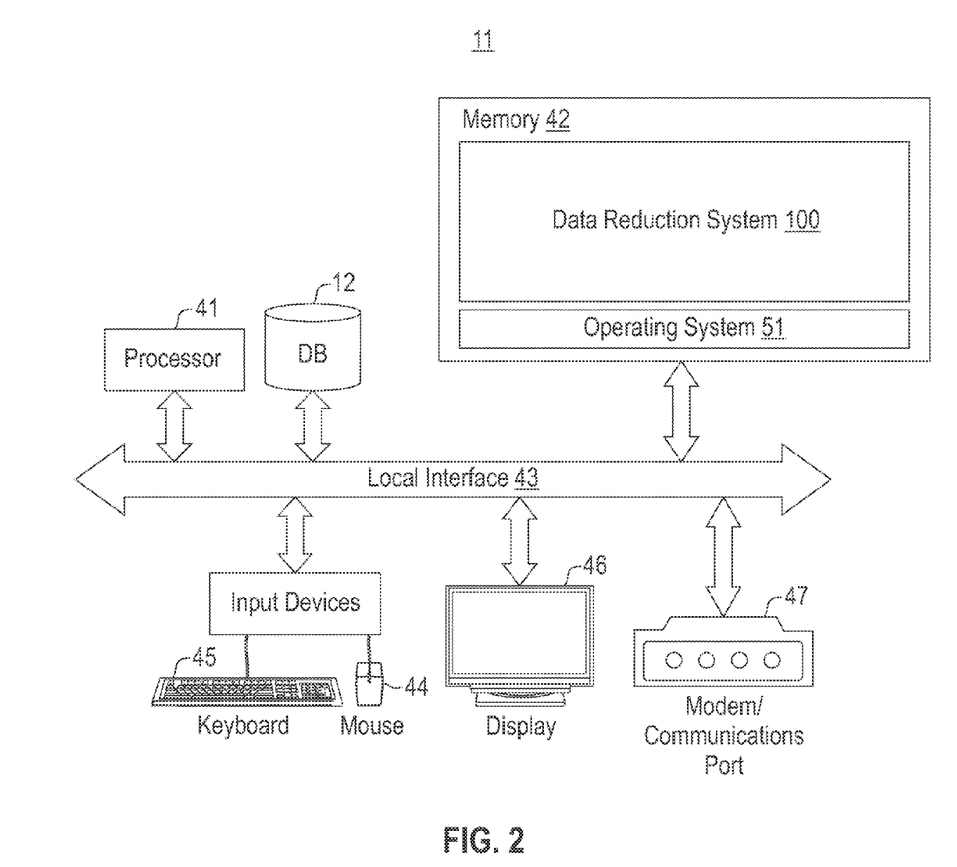
FIG. 2 is a block diagram illustrating an example of a server utilizing an adaptive data reduction process, according to an embodiment of the present invention, as shown in FIG. 1.

Illustrated in FIG. 2 is a block diagram demonstrating an example of the storage server 11, as shown in FIG. 1, utilizing an embodiment of the adaptive data reduction system 100 according to an embodiment of the present invention. The adaptive data reduction system 100 utilizes a selective data reduction process for data reduction in a file system, according to an embodiment of the invention. In another embodiment, the adaptive data reduction system 100 may be implemented as a standalone system as shown in FIG. 1.

According to embodiments of the invention, data is selected for data reduction based on the nature (attributes) of the data and therefore the benefit that data reduction is expected to provide for that data, to improve resource usage efficiency as described herein. Said expected benefit is based on expected effectiveness of data reduction processing for the data given the nature of the data.

In one embodiment, the invention provides an adaptive data reduction system 100 implementing the abovementioned features, to constrain the amount of processing resources (e.g., MIPS and memory bandwidth) expended by a storage system, while continuing to effectively support data reduction or even other high resource usage functions. In one embodiment, the adaptive data reduction system 100 is useful with current storage platforms, and will lower the cost/terabyte of many configurations by allowing configurations that have more storage (e.g., disks) attached to a controller subsystem of the storage system.

In one embodiment, the adaptive data reduction system monitors its own internal state such as processor usage and data paths, to be more selective or less selective about the amount of data reduction it performs. For example, for files that are marginally compressible, the adaptive data reduction system 100 may select to compress such files when processor load is light. The adaptive data reduction system 100 may forego file compression when processor load is heavy.

Figure 3:
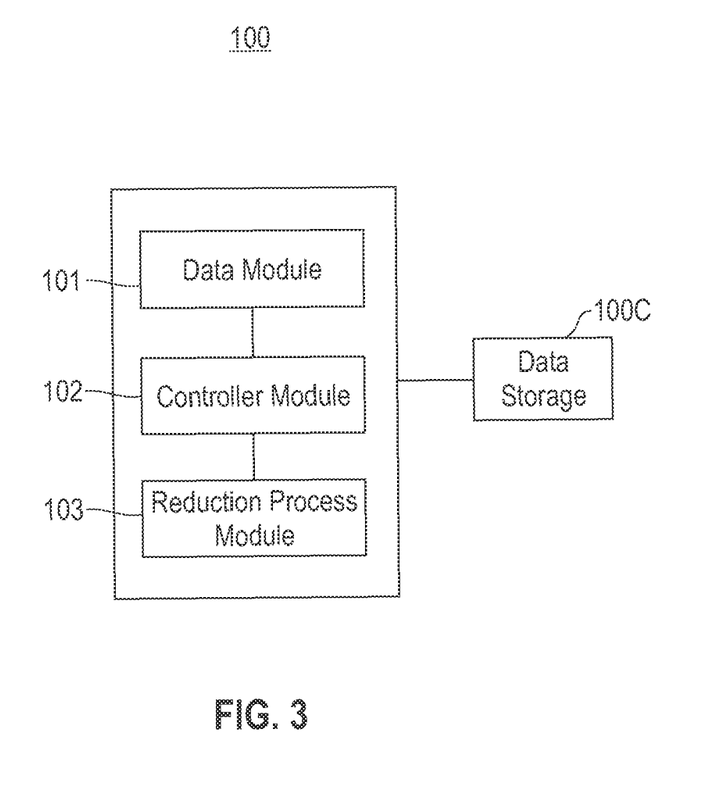
FIG. 3 shows a block diagram of components of an adaptive data reduction system for a file system of an information technology environment, according to an embodiment of the invention.

Referring to FIG. 3, in one implementation, the adaptive data reduction system 100 comprises a detection module 101 that detects when files being written to storage are not likely to make positive impact on data reduction effectiveness, and/or are likely to negatively impact system performance.

The adaptive data reduction system 100 further includes a controller module 102 that adapts the data path for servicing of such writes so as to selectively bypass data reduction (e.g., bypass either compression or deduplication, or both). The adaptive data reduction system 100 further includes a reduction process module 103 that performs data reduction as determined by the controller module 102. Finally, data is stored in the data storage 100C.

Figure 4A:
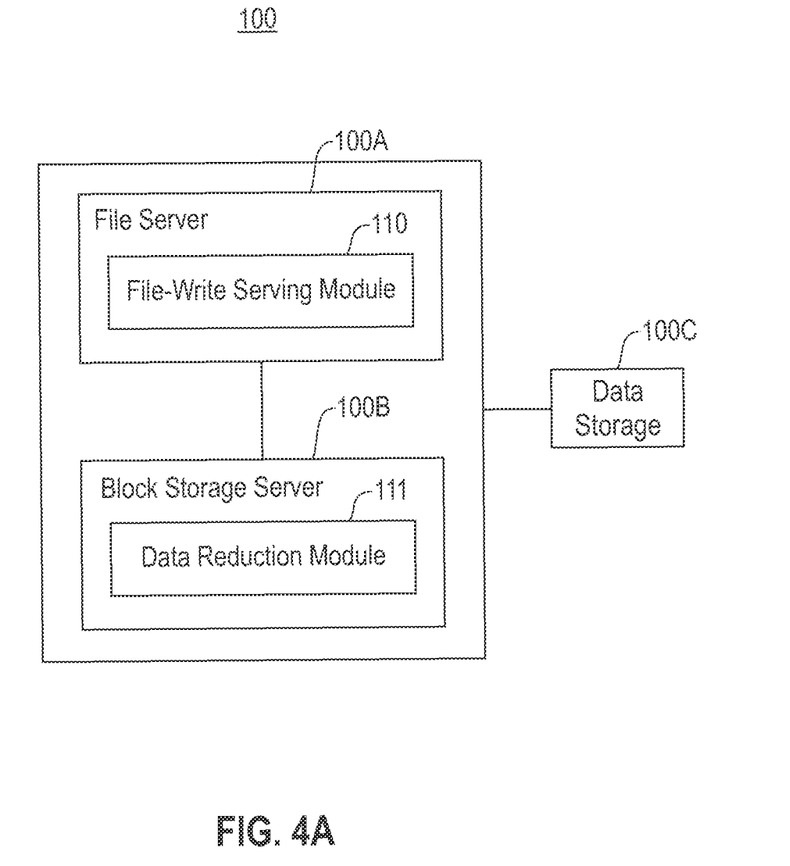
FIG. 4A shows a block diagram of components of a storage system including an adaptive data reduction system, according to an embodiment of the invention.

Referring to FIG. 4A, in another implementation, the present invention provides a storage system including an adaptive data reduction system 100 comprising a file-write serving module 110 which is invoked when a file write occurs and determines (by checking file characteristics such as file size and file type), whether the file data can benefit from data reduction techniques (e.g., compression, deduplication, etc).

The storage system further comprises a data reduction module 111 which receives write data. The data reduction module 111 uses the information from the file-write serving module 110 (indicating whether the file characteristics suggest that the file will benefit from data reduction), to selectively apply data reduction transformations to the write data.

In one implementation, the data reduction module 111 simultaneously achieves best data reduction effectiveness and performance for the write data, given limited processing resources by choosing to perform data reduction only on the data that will achieve maximum benefit, while ensuring that the current I/O load has enough processor resources to provide expected performance. For example, the data reduction module 111 balances the information it receives from the file-write serving module 110 with its own internal state (e.g., the processing load on the data reduction module 111), to decide on allocation of processing resources for compression and deduplication transformations of the write data. Finally, data is stored in the data storage 100C.

Figure 4B:
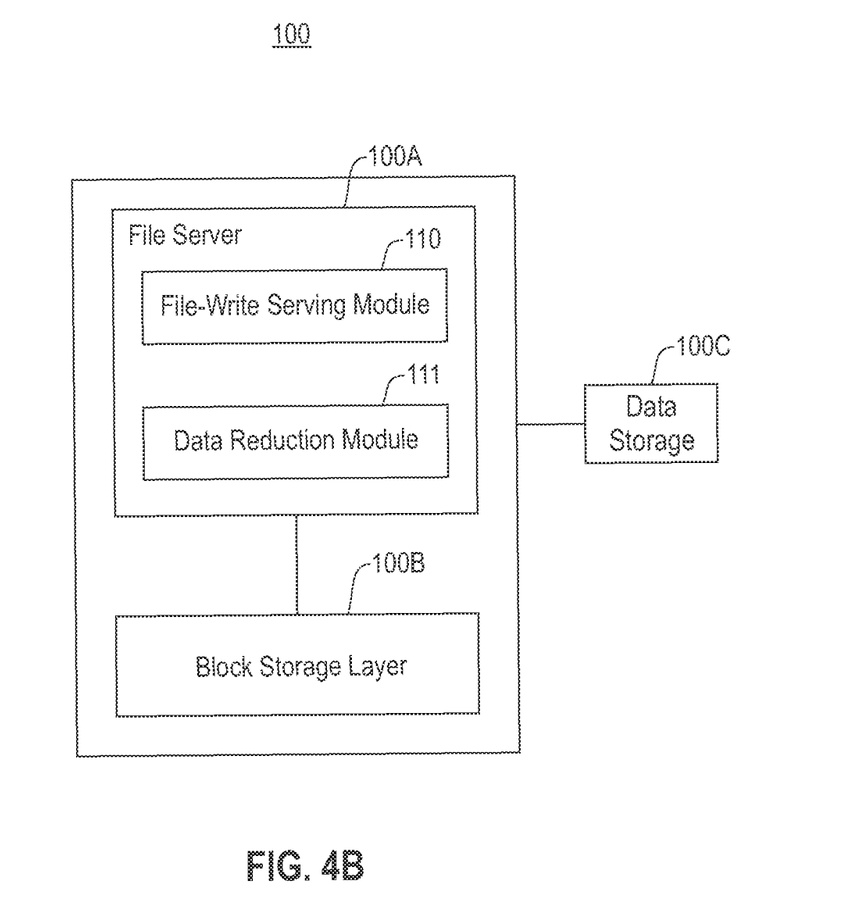
FIG. 4B shows a block diagram of components of a storage system including an adaptive data reduction system, according to another embodiment of the invention.
Figure 4C:
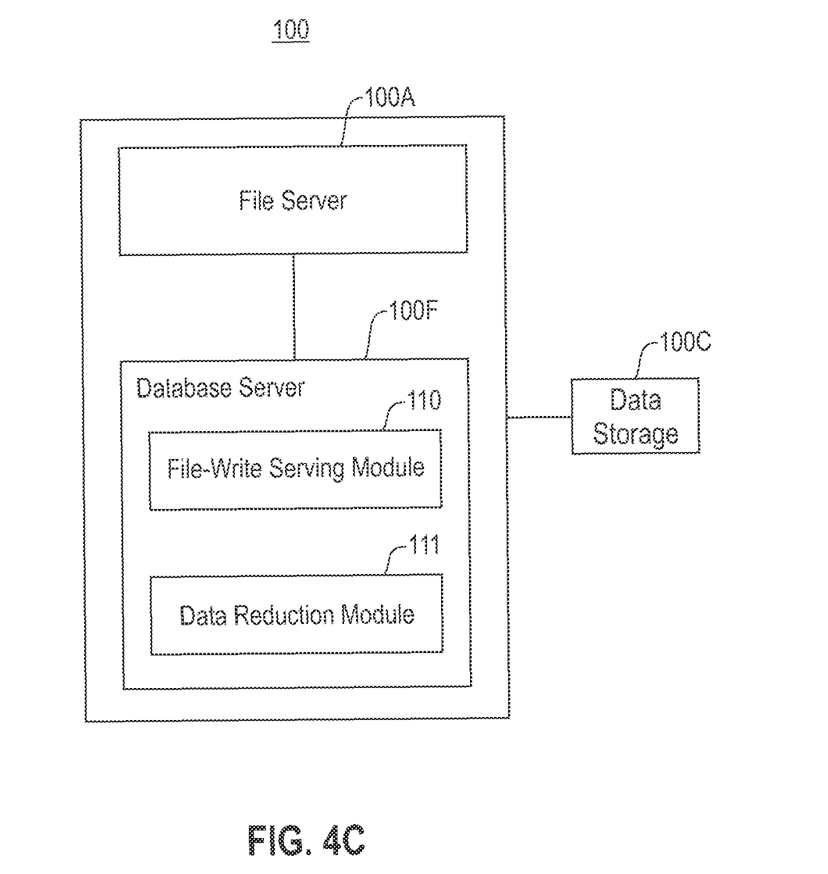
FIG. 4C shows a block diagram of components of a storage system including an adaptive data reduction system, according to another embodiment of the invention.

As shown in FIG. 4A, in one embodiment, the file-write serving module 110 may be a component of a file server 100A, while the data reduction module 111 may be a component of a block storage server 100B. In an alternative embodiment, shown in FIG. 4B, the file-write serving module 110 and the data reduction module 111 and block storage layer 100B may all be components of a file server 100A. In an alternative embodiment, shown in FIG. 4C, both the file-write serving module 110 and the data reduction module 111 may be a component of a database server 100F, etc. In said alternative embodiments, the invention operates similarly although the method of communicating the information between the two components 110 and 111 is different for the different storage system arrangements.

Figure 5:
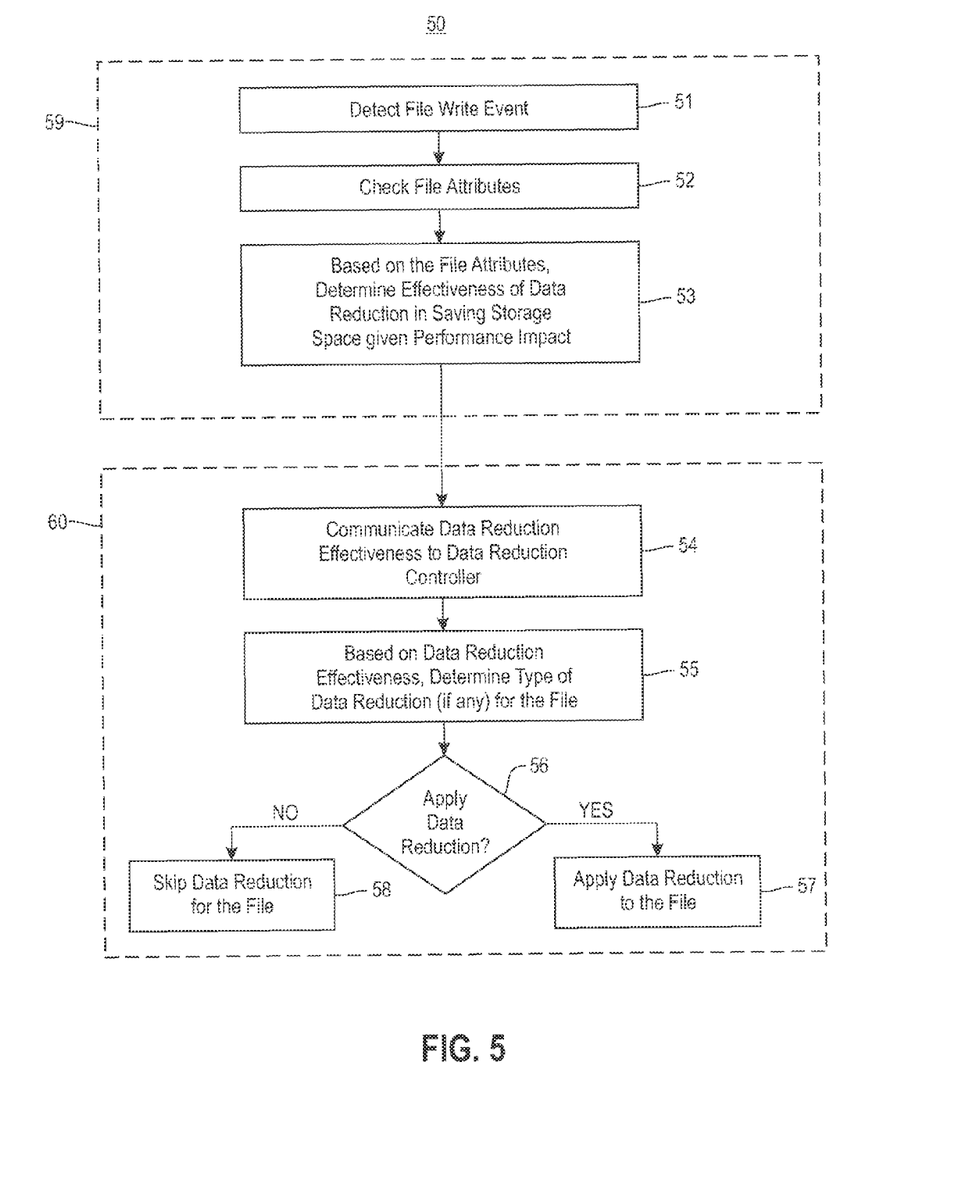
FIG. 5 shows a flowchart illustrating an adaptive data reduction process, according to an embodiment of the present invention.

FIG. 5 is a flowchart of an adaptive data reduction process 50 for the adaptive data reduction system 100 in a storage system, according to an embodiment of the invention. In a detection process 59, a process block 51 comprises detecting when a file is being written to storage. Process block 52 comprises checking attributes of the file. Process 53 comprises determining expected data reduction effectiveness in saving storage space given performance impact. One implementation comprises determining if based on the attributes, data reduction is likely to make positive impact on data reduction effectiveness, according to information described in previous paragraphs such as file size or by file type whether the file is likely to be uncompressible or short-lived.

Process block 54 comprises communicating the data reduction effectiveness determination to a data reduction controller module. In a data reduction process 60 of a data reduction controller module, data reduction is selectively applied to the data based on the expected data expected reduction effectiveness as weighed against system performance impact. Specifically, process block 55 comprises determining type of data reduction (if any) for the file based on data reduction effectiveness. According to process block 56, if data reduction is to be applied based on the determining step in process block 55, then in process block 57 data reduction is applied to the file, otherwise in process block 58 data reduction is skipped for the file (the file data is stored without data reduction).

In one embodiment, the process 50 simultaneously achieves best data reduction effectiveness and performance for the write data, given limited processing resources. Process block 55 balances the data reduction effectiveness information from process block 53 with processing load, to decide on allocation of processing resources for compression and deduplication transformations of the write data.

In the system 10 of FIG. 1, each of the remote devices 15 and 17-20 has applications and can have a local database 16. Server 11 contains applications, and a database 12 that may be accessed by remote device 15 and 17-20 via connections 14(A-F), respectively, over network 13. In one implementation, the server 11 executes software for a computer network and controls access to itself and database 12.

The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like or other like networks. The server 11 may also be connected to the LAN within an organization.

The remote device 15 and 17-20 may each be located at remote sites. Remote device 15 and 17-20 include but are not limited to, PCs, workstations, laptops, handheld computers, pocket PCs, PDAs, pagers, wireless application protocol (WAP) devices, non-WAP devices, cell phones, palm devices, printing devices and the like. When a user at one of the remote devices 15 and 17-20 desires to access data from the database 12 at the server 11, the remote device 15 and 17-20 communicates over the network 13, to access the server 11 and database 12.

Third party computer systems 21 and databases 22 can access the server 11 (FIG. 2). Data that is obtained from third party computer systems 21 and database 22 can be stored on server 11 and database 12 in order to provide later access to a user on remote devices 15 and 17-20. It is also contemplated that for certain types of data that the remote devices 15 and 17-20 can access the third party computer systems 21 and database 22 directly using the network 13.

In one embodiment the server 11 includes a storage system. Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the adaptive data reduction system 100 of the present invention. The adaptive data reduction system 100 comprises functional components and process blocks described herein.

The operating system 51 essentially controls the execution of other computer programs, such as the adaptive data reduction system 100, and provides scheduling, input/output control, file and data management, memory management, and communication control and related services. However, the adaptive data reduction system 100 of the present invention is applicable on all other commercially available operating systems.

The adaptive data reduction system 100 may comprise a source program, executable program (object code), script, or any other entity comprising a set of computer program instructions to be performed. When the adaptive data reduction system 100 is a source program, then the program is usually translated via a compiler, assembler, interpreter, or the like, which may or may not be included within the memory 42, so as to operate properly in connection with the O/S 51. Furthermore, the adaptive data reduction system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a network interface card (NIC) or modulator/demodulator 47 (for accessing remote devices, other files, devices, systems, or a network), a RF or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The adaptive data reduction system 100 and the O/S 51 are read, in whole or in part, by the processor 41, perhaps buffered within the processor 41, and then executed.

When the adaptive data reduction system 100 is implemented in software, as is shown in FIG. 2, it should be noted that the adaptive data reduction system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a RAM (electronic), a ROM (electronic), an EPROM, EEPROM, or Flash memory (electronic), an optical fiber (optical), and a CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

In an alternative embodiment, where the adaptive data reduction system 100 is implemented in hardware, the adaptive data reduction system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the adaptive data reduction system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote device 15 and 17-20 are similar to the description of the components for server 11 described with regard to FIG. 2. The remote devices 15 and 17-20 may be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for data reduction in a storage system having processor resources, the method comprising:
    determining attributes of data for storage in the storage system, wherein the attributes comprise size of the data, compression opportunity of the data, and longevity of the data;
    determining expected data reduction effectiveness for the data based on the attributes, wherein the expected data reduction effectiveness indicates whether the data will benefit from data reduction;
    determining an amount of the processor resources allocated for data reduction;
    determining whether to apply data reduction to the data or to bypass data reduction for the data based on the expected data reduction effectiveness and performance impact of applying data reduction to the data on the processor resources;

in response to determining to bypass data reduction for the data, adapting one or more data paths to bypass data reduction, such that the data is stored in the storage system without data reduction; and in response to determining to apply data reduction to the data:

selecting a type of data reduction technique from multiple types of data reduction techniques based on the attributes;

adjusting the amount of the processor resources allocated for data reduction based on the expected data reduction effectiveness, the selected type of data reduction technique, and the performance impact of applying data reduction to the data on the processor resources, thereby facilitating selective allocation of the processor resources to improve resource usage efficiency of the processor resources; and applying the selected type of data reduction technique to the data;

wherein the selected type of data reduction technique comprises data compression without deduplication if the size of the data does not exceed a pre-defined size or the longevity of the data does not exceed a pre-defined length of time; and wherein the selected type of data reduction technique comprises deduplication without data compression if the compression opportunity of the data indicates the data comprises one of pre-compressed data, uncompressible data, or encrypted data.

2. The method of claim 1, wherein adjusting the amount of the processor resources allocated for data reduction comprises:

selectively increasing or decreasing the amount of the processor resources allocated for data reduction based on the expected data reduction effectiveness, the selected type of data reduction technique, and performance impact of applying data reduction to the data on the processor resources.

3. The method of claim 2, further comprising:

providing multiple performance enhancement functions at different layers in a storage stack;

wherein the multiple performance enhancement functions comprise: a first enhancement function that collects and summarizes data reduction effectiveness information for a unit of data, and a second performance enhancement function that uses the data reduction effectiveness information for selectively allocating the processor resources.

4. The method of claim 1, wherein the selected type of data reduction technique comprises data compression without deduplication if the data is one of the following: a file having a size that is equal to or smaller than the pre-defined size, or a file having a longevity that is equal to or shorter than the pre-defined length of time.

5. The method of claim 1, wherein the selected type of data reduction technique comprises deduplication without data compression if the data is one of the following: a pre-compressed file, an uncompressible file, or an encrypted file.

6. The method of claim 2, wherein:

the data is written to the storage system without data reduction if the amount of the processor resources allocated is decreased to zero.

7. The method of claim 2, wherein the amount of the processor resources allocated for data reduction is decreased if the data is one of the following: a file having a size that is equal to or smaller than a pre-defined size, a pre-compressed file, an uncompressible file, an encrypted file, or a file having a longevity that is equal to or shorter than a pre-defined length of time.

8. A system comprising:

at least one processor; and a non-transitory computer readable medium storing instructions that when executed by the at least one processor causes the at least one processor to perform operations including:

determining attributes of data for storage in the storage system, wherein the attributes comprise size of the data, compression opportunity of the data, and longevity of the data;

determining expected data reduction effectiveness for the data based on the attributes, wherein the expected data reduction effectiveness indicates whether the data will benefit from data reduction;

determining an amount of the processor resources allocated for data reduction;

determining whether to apply data reduction to the data or to bypass data reduction for the data based on the expected data reduction effectiveness and performance impact of applying data reduction to the data on the processor resources;

in response to determining to bypass data reduction for the data, adapting one or more data paths to bypass data reduction, such that the data is stored in the storage system without data reduction; and in response to determining to apply data reduction to the data:

selecting a type of data reduction technique from multiple types of data reduction techniques based on the attributes;

adjusting the amount of the processor resources allocated for data reduction based on the expected data reduction effectiveness, the selected type of data reduction technique, and the performance impact of applying data reduction to the data on the processor resources, thereby facilitating selective allocation of the processor resources to improve resource usage efficiency of the processor resources; and applying the selected type of data reduction technique to the data;

wherein the selected type of data reduction technique comprises data compression without deduplication if the size of the data does not exceed a pre-defined size or the longevity of the data does not exceed a pre-defined length of time; and wherein the selected type of data reduction technique comprises deduplication without data compression if the compression opportunity of the data indicates the data comprises one of pre-compressed data, uncompressible data, or encrypted data.

9. The system of claim 8, wherein adjusting the amount of the processor resources allocated for data reduction comprises:

selectively increasing or decreasing the amount of the processor resources allocated for data reduction based on the expected data reduction effectiveness, the selected type of data reduction technique, and performance impact of applying data reduction to the data on the processor resources.

10. The system of claim 9, the operations further comprising:
providing multiple performance enhancement functions at different layers in a storage stack;
wherein the multiple performance enhancement functions comprise: a first enhancement function that collects and summarizes data reduction effectiveness information for a unit of data, and a second performance enhancement function that uses the data reduction effectiveness information for selectively allocating the processor resources.

11. The system of claim 8, wherein:
the selected type of data reduction technique comprises data compression without deduplication if the data is one of the following: a file having a size that is equal to or smaller than the pre-defined size, or a file having a longevity that is equal to or shorter than the pre-defined length of time; and
the selected type of data reduction technique comprises deduplication without data compression if the data is one of the following: a pre-compressed file, an uncompressible file, or an encrypted file.

12. The system of claim 9, wherein:
the data is written to the storage system without data reduction if the amount of the processor resources allocated is decreased to zero.

13. The system of claim 9, wherein the amount of the processor resources allocated for data reduction is decreased if the data is one of the following: a file having a size that is equal to or smaller than a pre-defined size, a pre-compressed file, an uncompressible file, an encrypted file, or a file having a longevity that is equal to or shorter than a pre-defined length of time.

14. A computer program product comprising a non-transitory computer readable medium having program code embodied therewith, the program code being executable by a computer to implement instructions for data reduction in a storage system having processor resources, the instructions comprising:
determining attributes of data for storage in the storage system, wherein the attributes comprise size of the data, compression opportunity of the data, and longevity of the data;
determining expected data reduction effectiveness for the data based on the attributes, wherein the expected data reduction effectiveness indicates whether the data will benefit from data reduction;
determining an amount of the processor resources allocated for data reduction;
determining whether to apply data reduction to the data or to bypass data reduction for the data based on the expected data reduction effectiveness and performance impact of applying data reduction to the data on the processor resources;
in response to determining to bypass data reduction for the data, adapting one or more data paths to bypass data reduction, such that the data is stored in the storage system without data reduction; and
in response to determining to apply data reduction to the data:
selecting a type of data reduction technique from multiple types of data reduction techniques based on the attributes;
adjusting the amount of the processor resources allocated for data reduction based on the expected data reduction effectiveness, the selected type of data reduction technique, and the performance impact of applying data reduction to the data on the processor resources, thereby facilitating selective allocation of the processor resources to improve resource usage efficiency of the processor resources; and
applying the selected type of data reduction technique to the data;
wherein the selected type of data reduction technique comprises data compression without deduplication if the size of the data does not exceed a pre-defined size or the longevity of the data does not exceed a pre-defined length of time; and
wherein the selected type of data reduction technique comprises deduplication without data compression if the compression opportunity of the data indicates the data comprises one of pre-compressed data, uncompressible data, or encrypted data.

15. The computer program product of claim 14, wherein adjusting the amount of the processor resources allocated for data reduction comprises:
selectively increasing or decreasing the amount of the processor resources allocated for data reduction based on the expected data reduction effectiveness, the selected type of data reduction technique, and performance impact of applying data reduction to the data on the processor resources.

16. The computer program product of claim 15, the instructions further comprising:
providing multiple performance enhancement functions at different layers in a storage stack;
wherein the multiple performance enhancement functions comprise: a first enhancement function that collects and summarizes data reduction effectiveness information for a unit of data, and a second performance enhancement function that uses the data reduction effectiveness information for selectively allocating the processor resources.

17. The computer program product of claim 14, wherein the selected type of data reduction technique comprises data compression without deduplication if the data is one of the following: a file having a size that is equal to or smaller than the pre-defined size, or a file having a longevity that is equal to or shorter than the pre-defined length of time.

18. The computer program product of claim 14, wherein the selected type of data reduction technique comprises deduplication without data compression if the data is one of the following: a pre-compressed file, an uncompressible file, or an encrypted file.

19. The computer program product of claim 15, wherein:
the data is written to the storage system without data reduction if the amount of the processor resources allocated is decreased to zero.

20. The computer program product of claim 15, wherein the amount of the processor resources allocated for data reduction is decreased if the data is one of the following: a file having a size that is equal to or smaller than a pre-defined size, a pre-compressed file, an uncompressible file, an encrypted file, or a file having a longevity that is equal to or shorter than a pre-defined length of time.

* * * * *